United States Patent
Lowenstein

(10) Patent No.: US 7,804,198 B2
(45) Date of Patent: Sep. 28, 2010

(54) ELECTRICAL HARMONIC SUPPRESSION SYSTEM AND ENCLOSURE FOR THE SAME

(75) Inventor: Michael Z. Lowenstein, Monroeville, PA (US)

(73) Assignee: Harmonics Holdings, Inc., Pittsburgh, PA (US)

( * ) Notice: Subject to any disclaimer, the term of this patent is extended or adjusted under 35 U.S.C. 154(b) by 53 days.

(21) Appl. No.: 12/069,817

(22) Filed: Feb. 13, 2008

(65) Prior Publication Data

US 2008/0211315 A1    Sep. 4, 2008

Related U.S. Application Data

(60) Provisional application No. 60/901,599, filed on Feb. 15, 2007.

(51) Int. Cl.
*H02J 1/02* (2006.01)
*H02J 3/00* (2006.01)

(52) U.S. Cl. .................................. 307/105; 307/13

(58) Field of Classification Search ................ 307/105, 307/13
See application file for complete search history.

(56) References Cited

U.S. PATENT DOCUMENTS

| | | | | |
|---|---|---|---|---|
| 5,416,458 | A | * | 5/1995 | Menke et al. ................. 336/12 |
| 6,636,405 | B2 | | 10/2003 | Lowenstein |
| 2008/0129122 | A1 | * | 6/2008 | Yu et al. ..................... 307/105 |

* cited by examiner

*Primary Examiner*—Michael Rutland Wallis
(74) *Attorney, Agent, or Firm*—David G. Oberdick

(57) ABSTRACT

In an electrical distribution system for supplying power from an AC source to an adjustable-speed drive connected in a single-phase manner, a device for substantially eliminating harmonic currents in the supply lines of said system. The device includes a completely-passive parallel resonant circuit having three passive electrical branches connected in parallel and also having an almost infinite impendence at a third harmonic frequency of a fundamental frequency of said AC source to prevent the formation of only said third harmonic frequency so that there is no third harmonic current to remove or dissipate as heat. The three passive electrical branches comprise a first branch consisting of a capacitor, a second branch consisting of a reactor, and a third branch consisting of a resistor. The parallel resonant circuit is electrically connected to at least one supply line.

18 Claims, 5 Drawing Sheets

ELECTRICAL HARMONIC SUPPRESSION SYSTEM AND ENCLOSURE FOR THE SAME

PRIORITY

This application hereby claims priority to provisional patent application Ser. No. 60/901,599, filed on Feb. 15, 2007.

FIELD OF THE INVENTION

The present invention generally relates to an electrical harmonic suppression System and enclosure for the same and more particularly relates to a harmonic suppression System that has application in a remote location, such as a gas well site, and a weatherproof, durable, and easily installed enclosure for the same.

BACKGROUND OF THE INVENTION

With the rise in natural gas prices attention is being focused on new sources of energy. It has been known for many years that there is a large quantity of natural gas associated with underground coal beds. Due to the porous nature of coal, many times the volume of gas per cubic foot of solid material is more readily available when compared to gas found in rocky formations. The gas is under high pressure, and is associated with large quantities of water which also permeate the coal bed.

The most common method for extracting this coal-bed methane is to drill a well into the coal and pump out the water, thus lowering the pressure on the gas. As the pressure on the bed is lowered, gas migrates to the well and is removed, separated from the water, and processed for shipment. The pumps are electrically driven and pumping is regulated by using variable-frequency drives (VFDs) to control motor speed. These VFDs draw harmonic currents from the utility electrical system, thus providing an opportunity for the application of harmonic mitigating technologies.

Harmonics in an electrical distribution system are caused by the types of loads connected to the system. Modern electronic equipment and controls, because they draw current in a non-linear fashion, causing harmonic currents to flow throughout the system. The extra harmonic currents may result in overloading or failure of system components.

The VFDs powering pumps used for coal-bed methane production, like all other VFDs, draw these harmonic currents. Most of the pumping sites are remote to civilization and most do not have power already available. Utilities have been forced to extend power lines many miles for fairly small loads; not a cost effective practice. To save money on running long lines, the utility companies usually provide only single-phase 480 or 240 volt power, thus reducing line costs. However, there is a major problem with this method of power distribution.

There are few or no VFDs made over about 10 hp that are designed to run on single-phase power. It is much more cost effective to install a 3-phase drive and power it from a single-phase line. The drive must be de-rated, such that it is capable of handling only about 57% of the drive's nameplate horsepower. Common practice is to de-rate a drive to about 50% nameplate when it is single phased. (i.e., to run a 10 hp motor, a 20 hp drive is required.) This means that the single-phase line must supply about twice the current that a 3-phase line would supply to power the motor. This also means that the harmonic currents drawn by the drive are not in the 3-phase spectrum (5 & 7, 11 & 13, etc.), but are instead the single phase spectrum consisting primarily of the 3rd harmonic. The 3rd harmonic current drawn by a drive may optionally be equal to or greater than the fundamental (60 Hz in the US) current.

These extra harmonic currents must be transmitted through long distribution lines to the drive, causing significant power or energy losses and voltage drop. Further, when the various lines to multiple drives are combined back onto the 3-phase system, the 3rd harmonic currents will add into the distribution system neutral, back to the substation, causing further power or energy losses.

Again, since this related system is not very robust, the high 3rd harmonic currents cause problems at the substation level. Problems include, but are not limited to, reduced capacity on an already weak system and neutral and transformer overloading and overheating.

This harmonic problem has been observed wherever single-phase drives are used to support coal bed gas production, and the number of drives causing the problem is increasing rapidly. At least one utility company already has over 2,000 wells connected and has plans for over 500 more per year in the near future. An improved Harmonic Suppression System, designed specifically for a remote site and/or coal-bed methane pumping applications is disclosed herein. The present invention improves upon the invention disclosed at U.S. Pat. No. 6,636,405, with the present invention having particular application to the remote field locations described above. Testing has shown that this improved Harmonic Suppression System design is successful in reducing the 3rd harmonic problem.

SUMMARY OF THE INVENTION

In an electrical distribution system for supplying power from an AC source to an adjustable-speed drive connected in a single-phase manner, the Harmonic Suppression System for substantially eliminating harmonic currents in the supply lines of the system is disclosed. The Harmonic Suppression System comprises a completely-passive parallel resonant circuit having three passive electrical branches, connected in parallel, and the completely-passive parallel resonant circuit having an almost infinite impendence at a 3rd harmonic frequency of the fundamental frequency of the AC source to prevent the formation of the 3rd harmonic frequency so that there is not a 3rd harmonic current to remove or dissipate as heat. The three passive electrical branches comprise a first branch consisting of a capacitor, a second branch consisting of a reactor, and a third branch consisting of a resistor. The completely-passive parallel resonant circuit is electrically connected to at least one supply line, whereby the Harmonic Suppression System renders the electrical distribution system free of the 3rd harmonic frequency, both toward the existing drive and back to the AC source. The completely passive parallel resonant circuit is in series with one or more of the supply lines.

It is a further object of the present invention to provide an electrical system for supplying power to one or more adjustable speed drives electrically connected, in a single-phase manner, to each separate pair of two of the secondary side three phase lines of a 3-phase distribution system comprising a delta-wye or wye-wye transformer and a completely-passive parallel resonant circuit, having three passive electrical branches connected in parallel. The first completely-passive parallel resonant circuit has almost infinite impedance at a 3rd harmonic frequency of a fundamental frequency of the AC source to prevent the formation of only the 3rd harmonic frequency so that there is not a 3rd harmonic frequency to remove or dissipate as heat. The three passive electrical branches comprise a first branch consisting of a capacitor, a second branch consisting of a reactor, and a third branch consisting of a resistor. The completely-passive parallel resonant circuit is electrically connected near the adjustable-speed drives, to a different one of the three phase line in each of the pairs of phase lines coming from of the wye secondary side of the transformer, whereby the electrical system is rendered free of the 3rd harmonic frequency in all phase lines, both toward the adjustable-speed drives and back to the transformer. Each pair of phase lines of the multiple phase electrical distribution system supplies power to an associated one of the nonlinear loads.

Another object of the present invention, in an embodiment where the System is small, is to provide a Harmonic Suppression System and an enclosure for the Harmonic Suppression System, designed for mounting either within the already existing drive enclosure or attached to the outside of the existing drive enclosure. More specifically, the enclosure (i) is simple to mount, using standard fittings and requiring no special tools, (ii) can be easily and quickly attached to the existing drive enclosure by a person with standard electrical skills, with no special training necessary, (iii) contains a pre-mounted terminal block for electrical connections to the existing drive, (iv) is designed to be fastened, with standard hardware, to the outside of the existing drive enclosure and can also be close-nippled to the existing drive enclosure, simplifying wiring and mounting procedures, and/or (v) can be easily fastened with standard hardware to the inside of the existing drive enclosure if the Harmonic Suppression System is mounted internally. For larger Systems for higher-powered drives, enclosures will also be provided, but they will not fit within or be capable of being mounted on the drive enclosure.

Still another object of the present invention is to provide an enclosure for the Harmonic Suppression System that is weather resistant through use of, among other items, (i) welded seams where necessary to ensure protection of the internal circuitry when the Harmonic Suppression System unit is externally mounted, and/or (ii) powder coating to ensure resistance to rusting when the Harmonic Suppression System is externally mounted on or around the existing drive enclosure.

DETAILED DESCRIPTION OF THE PREFERRED EMBODIMENT

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated apparatus and method, and such further applications of the principles of the invention illustrated herein, as would normally occur to persons skilled in the art to which the invention relates.

Figure 1:
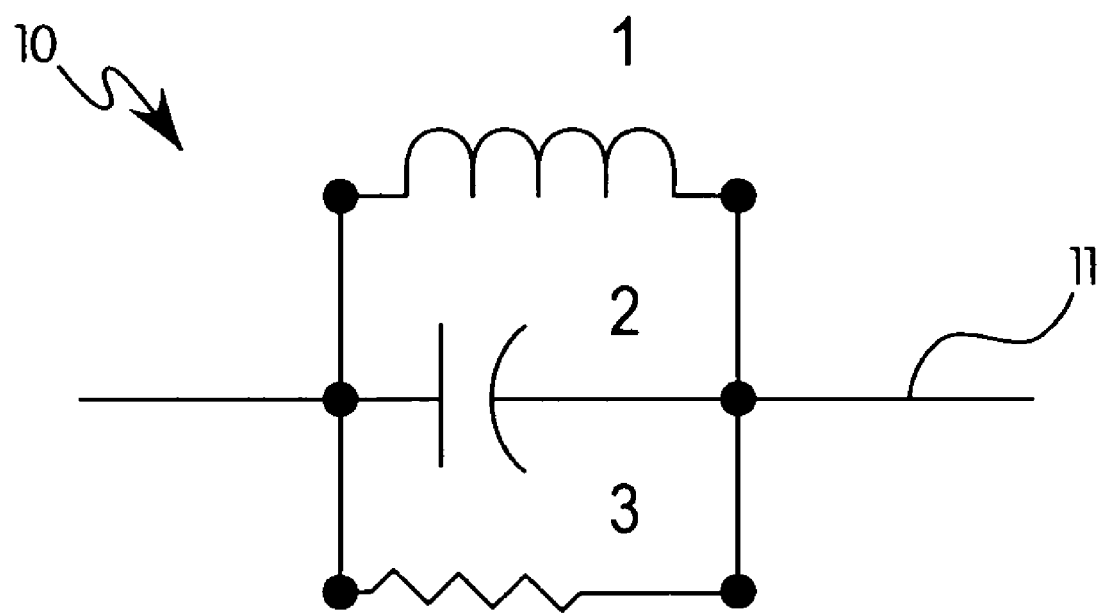
FIG. 1 is a schematic diagram of a Harmonic Suppression System in accordance with the present invention.

FIG. 1 shows a circuit schematic of one embodiment of the Harmonic Suppression System 10 according to the present invention. The Harmonic Suppression System 10 is completely passive and preferably comprises, a reactor 1, a capacitor 2, and a resistor 3 connected in parallel, and is tuned to the 3rd harmonic of the AC power source frequency. More specifically, in an electrical distribution system for supplying power from an AC source to an adjustable-speed drive connected in a single-phase manner, the Harmonic Suppression System 10 for substantially eliminating harmonic currents in the supply lines of the system is disclosed. The Harmonic Suppression System comprises a completely-passive parallel resonant circuit having three passive electrical branches, connected in parallel, and the completely-passive parallel resonant circuit having an almost infinite impendence, at a 3rd harmonic frequency of a fundamental frequency of the AC source, to prevent the formation of only the 3rd harmonic frequency so that there is not a 3rd harmonic current to remove or dissipate as heat.

The three passive electrical branches, as shown in FIG. 1, comprise a first branch consisting of a reactor 1, a second branch consisting of a capacitor 2, and a third branch consisting of a resistor 3. The completely-passive parallel resonant circuit is electrically connected to at least one supply line 11, whereby the Harmonic Suppression System 10 renders the electrical supply system free of the $3^{rd}$ harmonic frequency, both toward the existing drive and back to the AC source. The completely passive parallel resonant circuit is in series with the supply lines to which the circuit is electrically connected.

Figure 2:
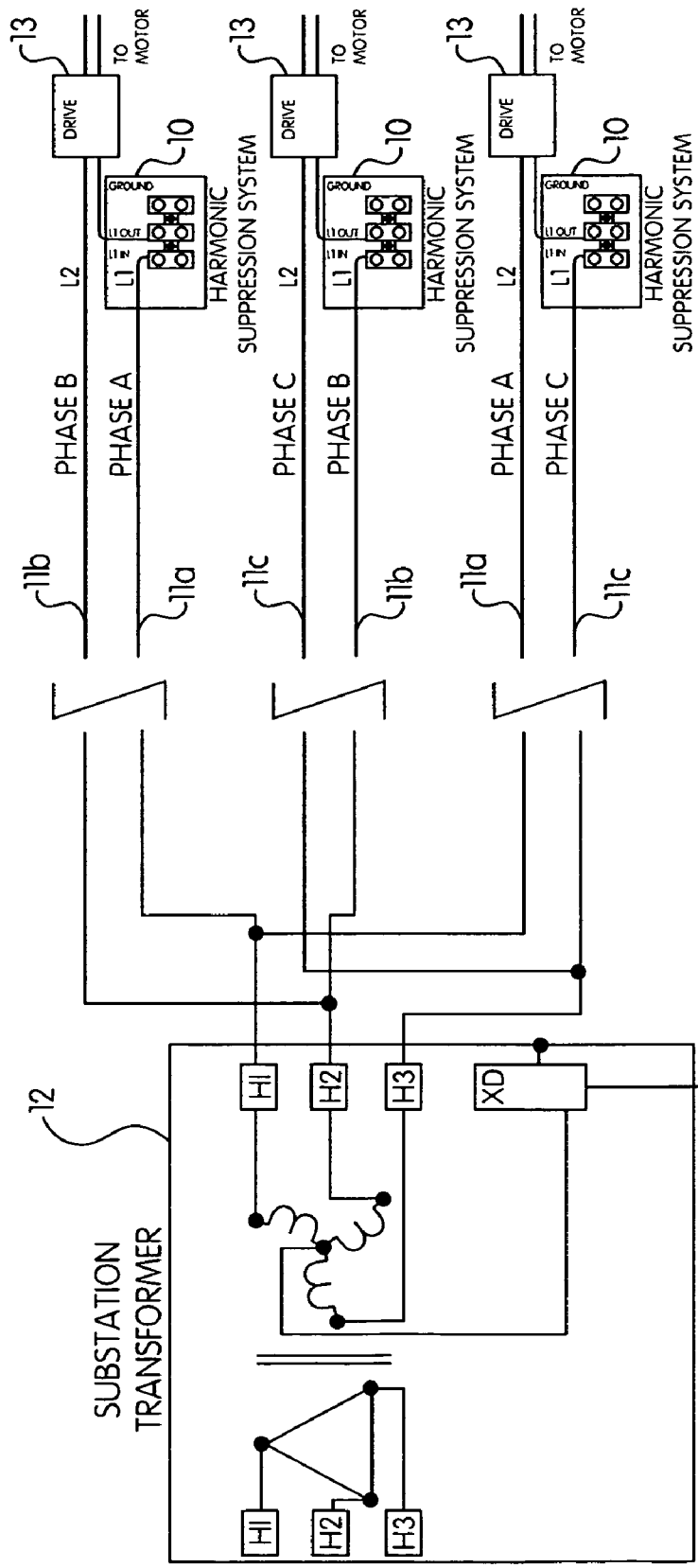
FIG. 2 is a schematic block diagram of an embodiment of the present invention connected in a 3-phase secondary side wye-connected electrical power system.
Figure 3:
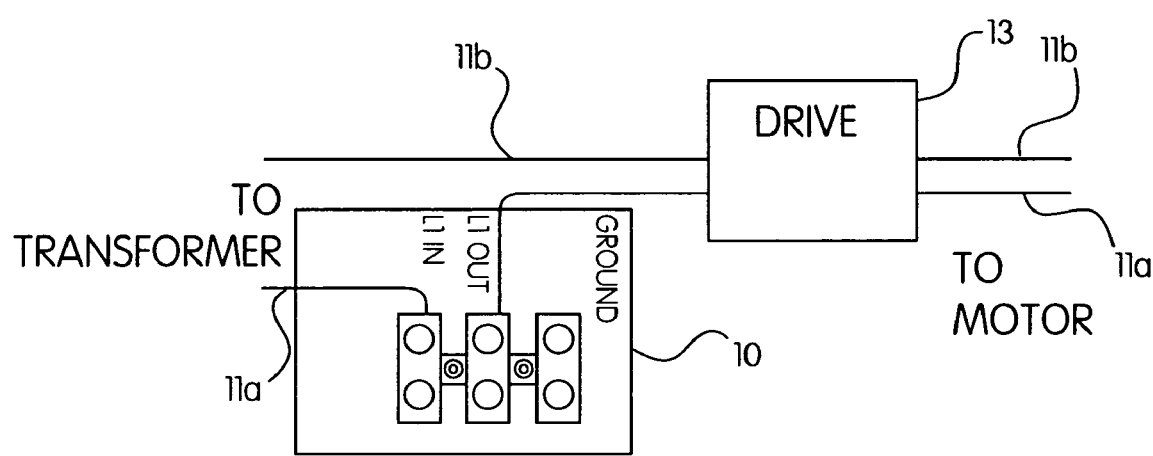
FIG. 3 is a schematic block diagram showing how the Harmonic Suppression System of the present invention is attached to a drive, device or load.

Referring to FIGS. 2 and 3, an embodiment of the present invention is shown in an electrical system for supplying power to one or more adjustable speed drives, wherein a Harmonic Suppression System 10 is electrically connected, in a single-phase manner, to each separate pair of two of the three phase lines 11a, 11b and 11c of a 3-phase distribution system. This 3-phase distribution system comprises a supply transformer 12 and the Harmonic Suppression System 10 of the present invention (shown in FIG. 1), which acts to provide a completely-passive parallel resonant circuit, having three passive electrical branches connected in parallel. Transformer 12 can be a delta-wye or wye-wye transformer. The first completely-passive parallel resonant circuit has almost infinite impedance at a 3rd harmonic frequency of a fundamental frequency of the AC source to prevent the formation of only the 3rd harmonic frequency so that there is not a 3rd harmonic frequency to remove or dissipate as heat. The three passive electrical branches (as shown in FIG. 1) comprise a first branch consisting of a capacitor 1, a second branch consisting of a reactor 2, and a third branch consisting of a resistor 3. The completely-passive parallel resonant circuit is electrically connected near the adjustable-speed drives 13, to a different one of the three phase line 11a, 11b and 11c in each separate pair of two phase lines—11a and 11b, 11b and 11c, and 11a and 11c—coming from of the wye-portion of the wye secondary side of supply transformer 12, whereby the electrical system is rendered free of the 3rd harmonic frequency in all phase lines, both toward the adjustable-speed drives 13 and back to the wye secondary side of transformer 12. Each phase line of the multiple phase electrical distribution system supplies power to an associated one of the nonlinear loads.

Figure 4:
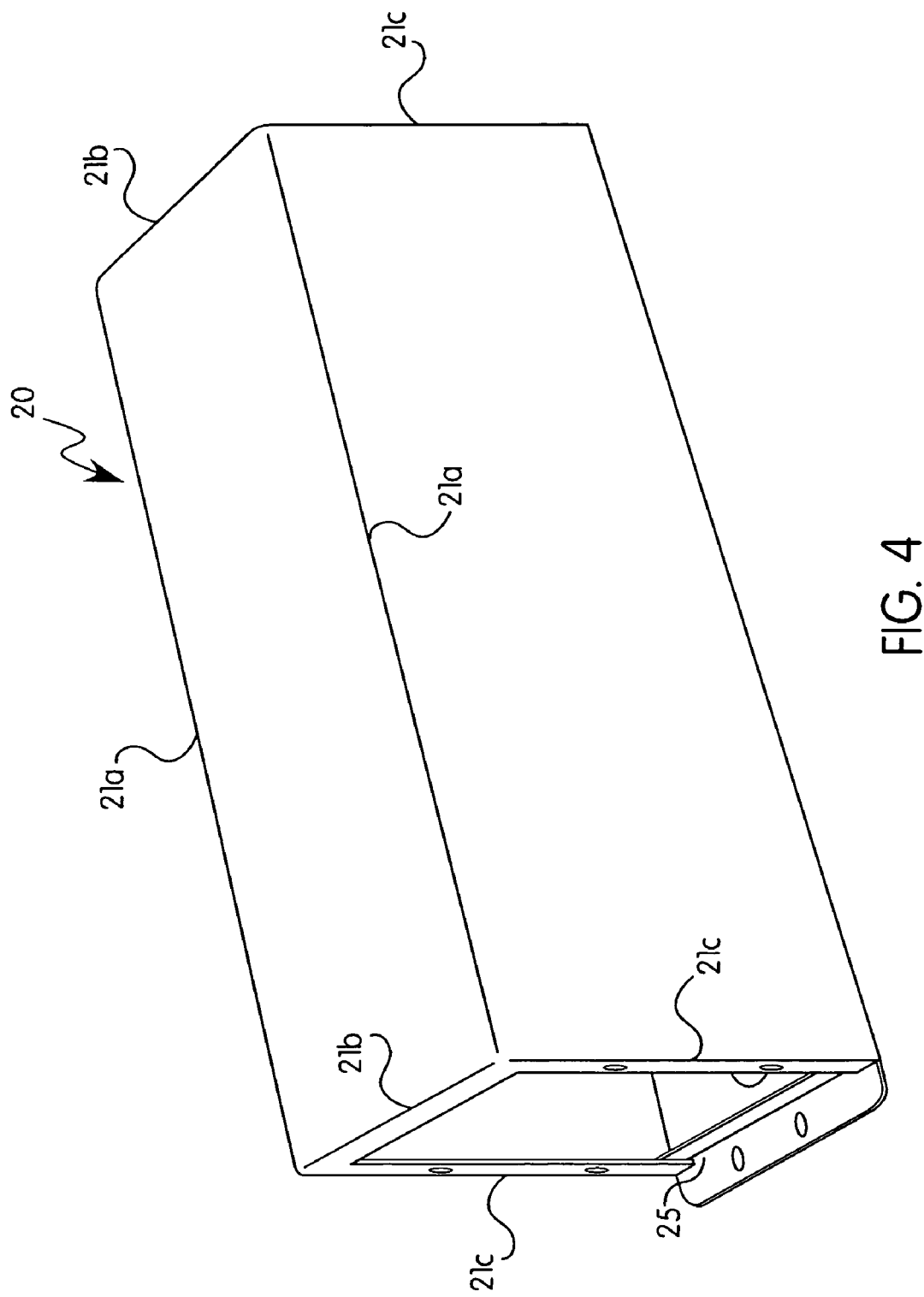
FIG. 4 is a side perspective view of the waterproof enclosure of the present invention.
Figure 5:
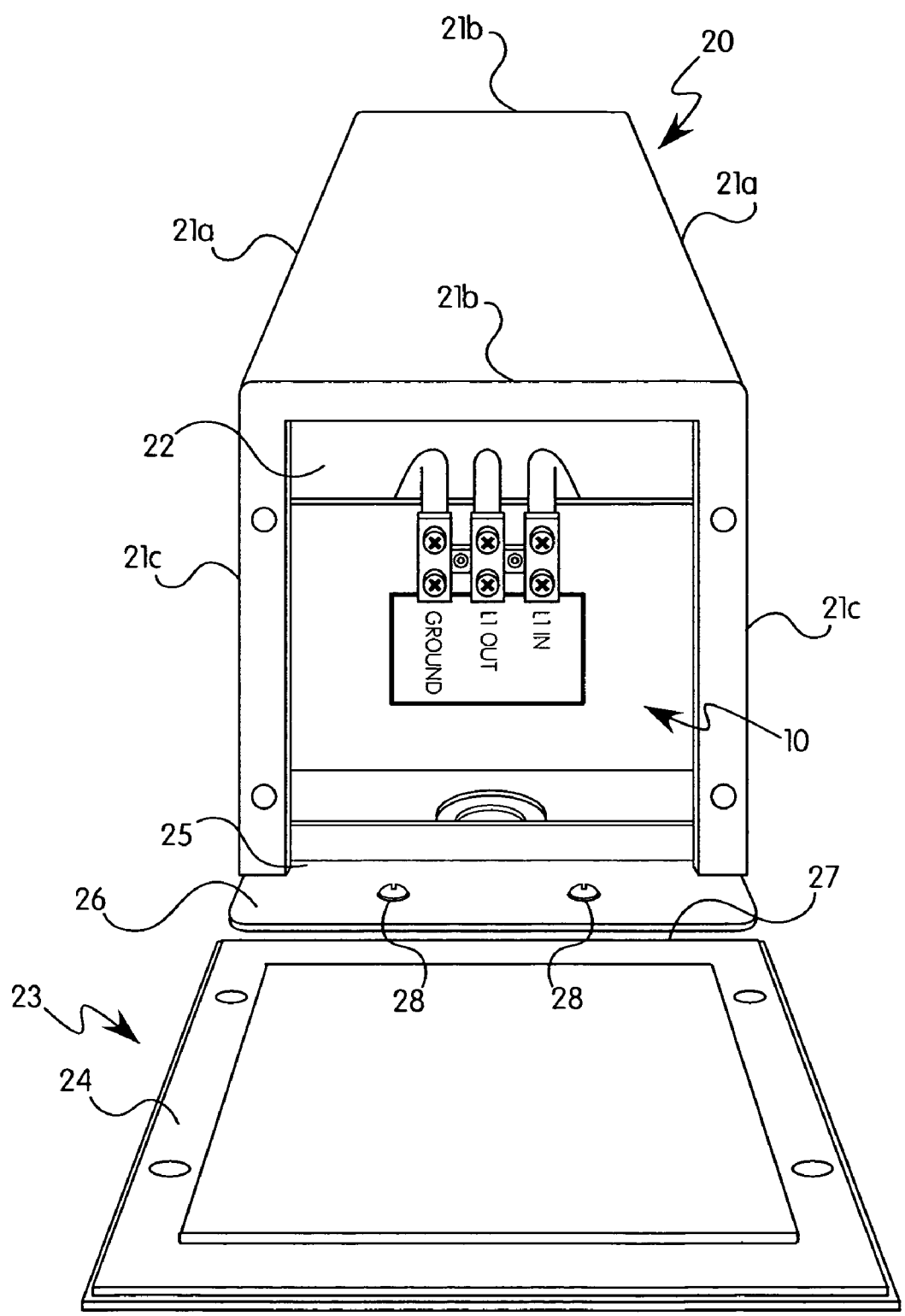
FIG. 5 is an end perspective view of the waterproof enclosure of the present invention.

As depicted in FIG. 4, an enclosure for a smaller embodiment of the present invention provides a waterproof, durable enclosure 20 to the Harmonic Suppression System and protects the Harmonic Suppression System from the elements, when mounted external to the existing drive at a remote site or gas well site (for larger Systems, System enclosures are too large to mount to the drive). The enclosure 20 is welded at the seams, e.g., seams 21*a*, 21*b* and 21*c*, to prevent water, air or other elements from encroaching the Harmonic Suppression System. One end of the enclosure has an optional open end 22 for insertion of System 10 and also for mounting on an existing drive. A waterproof cover 23 can also be placed over this end to protect the Harmonic Suppression System 10 from the elements. This waterproof cover 23 has a gasket 24 surrounding its perimeter to provide a sealing effect when attached to the end of the enclosure 20 via mounting screws. The Harmonic Suppression System 10 fits completely within the enclosure 20 and is thereby protected from the elements to aid in the proper functioning of the Harmonic Suppression System 10 for extended periods of time (see FIG. 7). The enclosure 20 defines a horizontal lower gap 25 between the bottom external mounting plate 26 of the enclosure 20 and the bottom edge of the waterproof cover 27 such that room exists for the mounting screw heads 28.

Installation of the present invention, in the field, preferably requires the following steps:

(1) Unpacking the Harmonic Suppression System 10 and enclosure by removing the external packing materials and checking for any damage.

(2) Mounting the Harmonic Suppression System 10 and enclosure 20 directly, either externally or internally, to an existing field drive enclosure. Optionally, the Harmonic Suppression System 10 and enclosure 20 can be floor, ground or wall mounted, with a conduit or other connection to the existing drive enclosure.

(3) Wiring the Harmonic Suppression System 10, either through the use of a built-in wiring box or optionally for a larger device, through internal terminal lugs or blocks for landing wires. The Harmonic Suppression System 10 should be electrically connected to the input of the drive 13 as shown in FIG. 3. The Harmonic Suppression System is also preferably installed in series with one of the phase lines, e.g. line 11*a*, while the second phase line 11*b* should not be connected to the Harmonic Suppression System 10. The line sizes and temperature ratings should meet all local and national electrical codes.

(4) Testing the Harmonic Suppression System 10. In this step, all connections should be checked and verified for conformance with the installation diagrams before the Harmonic Suppression System 10 is energized. After the unit is energized, the drive should be checked thoroughly for proper operation.

The single phase Harmonic Suppression System 10 is a totally passive device and contains no electronic or control circuits. When the Harmonic Suppression System 10 is installed correctly, according to the installation instructions, no further attention needs be paid to its operation or functioning. The Harmonic Suppression System 10 should preferably be inspected annually. All connections should also preferably be inspected to ensure that lines are tight in their connectors. Additionally, there should not be any visible corrosion on any of the lines and terminals. A low-pressure air hose can optionally be used to blow accumulated dust from terminals and lines.

The invention claimed is:

1. A device for substantially eliminating harmonic currents in supply lines of a 3-phase electrical distribution system with a Phase A line, a Phase B line, and a Phase C line for supplying power from an AC source to an adjustable-speed drive, the device comprising:

a completely-passive parallel resonant circuit having three passive electrical branches connected in parallel;

wherein the completely-passive parallel resonant circuit having an almost infinite impendence at a third harmonic frequency of a fundamental frequency of the AC source to prevent the formation of only the third harmonic frequency so that there is no third harmonic current to remove or dissipate as heat, wherein the three passive electrical branches comprise a first branch including a capacitor, a second branch including a reactor, and a third branch including a resistor, and wherein the completely-passive parallel resonant circuit being electrically connected in a single phase manner near the adjustable-speed drive to a supply line connected to the AC source, wherein the supply line comprises a pair of phase lines selected from the group consisting of a Phase A line/Phase B line pair, a Phase B line/Phase C line pair, and a Phase A line/Phase C line pair, whereby the device renders the electrical distribution system free of the third harmonic frequency both toward the drive and back to the AC source.

2. The system according to claim 1, wherein:
the completely-passive parallel resonant circuit is in series with the supply line.

3. The system according to claim 1, further comprising a waterproof enclosure that encloses the system, the casing having an open end to allow for placement of the system within the enclosure and mounting of the enclosure on a drive, and a waterproof cover for the open end of the enclosure.

4. An electrical system according to claim 1 wherein the completely-passive parallel resonant circuit is connected to the Phase A line of the Phase A line/Phase B line pair.

5. An electrical system according to claim 1 wherein the completely-passive parallel resonant circuit is connected to the Phase B line of the Phase A line/Phase B line pair.

6. An electrical system according to claim 1 wherein the completely-passive parallel resonant circuit is connected to the Phase B line of the Phase B line/Phase C line pair.

7. An electrical system according to claim 1 wherein the completely-passive parallel resonant circuit is connected to the Phase C line of the Phase B line/Phase C line pair.

8. An electrical system according to claim 1 wherein the completely-passive parallel resonant circuit is connected to the Phase A line of the Phase A line/Phase C line pair.

9. An electrical system according to claim 1 wherein the completely-passive parallel resonant circuit is connected to the Phase C line of the Phase A line/Phase C line pair.

10. An electrical system for supplying power to an adjustable speed drives, the electrical system comprising:

a supply transformer selected from the group consisting of a delta-wye and wye-wye transformer, and having a wye secondary side with a Phase A line, a Phase B line, and a Phase C line, a supply line from the supply transformer to the adjustable speed drive, wherein the supply line comprises a pair of phase lines selected from the group consisting of a Phase A line/Phase B line pair, a Phase B line/Phase C line pair, and a Phase A line/Phase C line pair; and a completely-passive parallel resonant circuit being electrically connected in a single phase manner near the adjustable-speed drive to one phase line of the pair of phase lines of the supply line wherein the completely-passive parallel resonant circuit having three passive electrical branches connected in parallel, wherein the completely-passive parallel resonant circuit having an almost infinite impedance at a third harmonic frequency of a fundamental frequency of the supply transformer to prevent the formation of only the third harmonic frequency so that there is no third harmonic frequency to remove or dissipate as heat, wherein the three passive electrical branches comprise a first branch including a capacitor, a second branch including a reactor, and a third branch including a resistor, whereby the electrical system is rendered free of the third harmonic frequency in all phase lines, both toward the adjustable-speed drives and back to the supply transformer.

11. The system according to claim 10, wherein each the one phase line supplies power to an associated nonlinear load.

12. An electrical system according to claim 10 wherein the one phase line is the Phase A line of the Phase A line/Phase B line pair.

13. An electrical system according to claim 10 wherein the one phase line is the Phase B line of the Phase A line/Phase B line pair.

14. An electrical system according to claim 10 wherein the one phase line is the Phase B line of the Phase B line/Phase C line pair.

15. An electrical system according to claim 10 wherein the one phase line is the Phase C line of the Phase B line/Phase C line pair.

16. An electrical system according to claim 10 wherein the one phase line is the Phase A line of the Phase A line/Phase C line pair.

17. An electrical system according to claim 10 wherein the one phase line is the Phase C line of the Phase A line/Phase C line pair.

18. The system according to claim 10, further comprising a waterproof enclosure that encloses the system, the casing having an open end to allow for placement of the system within the enclosure and mounting of the enclosure on a drive, and a waterproof cover for the open end of the enclosure.

* * * * *